United States Patent
Nishiki et al.

(10) Patent No.: US 11,269,314 B2
(45) Date of Patent: Mar. 8, 2022

(54) PLANT EVALUATION DEVICE, PLANT EVALUATION METHOD, AND PROGRAM

(71) Applicant: MITSUBISHI HEAVY INDUSTRIES, LTD., Tokyo (JP)

(72) Inventors: Hisashi Nishiki, Tokyo (JP); Tomoyuki Enomoto, Tokyo (JP); Hidenobu Otsu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/975,533

(22) PCT Filed: Feb. 14, 2019

(86) PCT No.: PCT/JP2019/005296
§ 371 (c)(1),
(2) Date: Aug. 25, 2020

(87) PCT Pub. No.: WO2019/167644
PCT Pub. Date: Sep. 6, 2019

(65) Prior Publication Data
US 2020/0401109 A1 Dec. 24, 2020

(30) Foreign Application Priority Data

Feb. 27, 2018 (JP) .............................. JP2018-033364

(51) Int. Cl.
*G05B 19/418* (2006.01)
(52) U.S. Cl.
CPC ................................ *G05B 19/418* (2013.01)
(58) Field of Classification Search
CPC ............ G05B 19/418; G05B 19/41875; G05B 2219/31414; G05B 23/0235;
(Continued)

(56) References Cited

U.S. PATENT DOCUMENTS

| 6,178,362 B1* | 1/2001 | Woolard | H02J 3/008 |
| | | | 700/295 |
| 2009/0210814 A1* | 8/2009 | Agrusa | G06T 11/206 |
| | | | 715/772 |

(Continued)

FOREIGN PATENT DOCUMENTS

| CN | 103984293 | 8/2014 |
| EP | 2 765 539 | 8/2014 |

(Continued)

OTHER PUBLICATIONS

International Search Report dated May 21, 2019 in International (PCT) Application No. PCT/JP2019/005296, with English translation.

(Continued)

*Primary Examiner* — Kidest Bahta
(74) *Attorney, Agent, or Firm* — Wenderoth, Lind & Ponack, L.L.P.

(57) ABSTRACT

An acquisition unit acquires a quantity relating to an operating rate of a facility of a plant and a quantity relating to energy consumption of the facility. An index value specification unit specifies a higher index value as the energy consumption is lower, and a higher index value as the operating rate is higher, or a lower index value as the energy consumption is lower, and a lower index value as the operating rate is higher, based on the quantity acquired by the acquisition unit. An index value output unit outputs information relating to the index value.

7 Claims, 9 Drawing Sheets

(58) Field of Classification Search
CPC .... G06Q 10/0639; G06Q 50/04; Y02P 80/10; Y02P 90/02
See application file for complete search history.

(56) References Cited

U.S. PATENT DOCUMENTS

2014/0371933 A1* 12/2014 Iwamura ............... G06F 1/3209
  700/291
2015/0212975 A1  7/2015 Inoue
2016/0079756 A1  3/2016 Ikeyama et al.
2016/0342392 A1  11/2016 Tasaki

FOREIGN PATENT DOCUMENTS

| JP | 2004-206216 | 7/2004 |
| JP | 2014-153942 | 8/2014 |
| JP | 5790952 | 10/2015 |
| JP | 5930225 | 6/2016 |
| JP | 2016-122416 | 7/2016 |
| JP | 2017-59138 | 3/2017 |

OTHER PUBLICATIONS

Written Opinion of the International Searching Authority dated May 21, 2019 in International (PCT) Application No. PCT/JP2019/005296, with English translation.

* cited by examiner

PLANT EVALUATION DEVICE, PLANT EVALUATION METHOD, AND PROGRAM

TECHNICAL FIELD

The present invention relates to a plant evaluation device, a plant evaluation method, and a program.

Priority is claimed on Japanese Patent Application No. 2018-033364, filed on Feb. 27, 2018, the content of which is incorporated herein by reference.

BACKGROUND ART

As an index representing production effectiveness of a plant, overall facility effectiveness (Overall Equipment Effectiveness: OEE) is known. In a production management of the plant, an operation state and a production schedule of a production facility are reviewed so that the OEE maintains a constant value by recognizing the OEE of the plant. Patent Literature 1 discloses a technique in which a relationship between an energy consumption quantity such as an energy consumption rate and a production quantity is displayed in order to evaluate energy efficiency.

CITATION LIST

Patent Literature

[Patent Literature 1]
Japanese Patent No. 5930225

SUMMARY OF INVENTION

Technical Problem

In recent years, there is a demand for effective use of limited resources. In a production management of a plant, it is desirable to consider not only production effectiveness but also energy efficiency. OEE is an index relating to the production effectiveness and cannot be used in evaluating the energy efficiency. On the other hand, an energy consumption rate is an index relating to the energy efficiency and cannot be used in evaluating the production effectiveness. It is conceivable to carry out the production management while both the OEE and the energy consumption rate are monitored. However, in general, a trade-off relationship exists between the production effectiveness and the energy efficiency. Consequently, it is difficult to determine that an appropriate operation is performed under what relationship between the both.

An object of the present invention is to provide a plant evaluation device, a plant evaluation method, and a program, which can easily evaluate a plant in view of production effectiveness and energy efficiency.

Solution to Problem

According to a first aspect of the present invention, a plant evaluation device includes an acquisition unit that is configured to acquire a quantity relating to an operating rate of a facility of a plant, and a quantity relating to energy consumption of the facility, an index value specification unit that is configured to specify an index value that is higher as the energy consumption is lower and that is higher as the operating rate is higher, or an index value that is lower as the energy consumption is lower and that is lower as the operating rate is higher, based on the quantity acquired by the acquisition unit, and an index value output unit that is configured to output information relating to the index value.

According to a second aspect of the present invention, in the plant evaluation device according to the first aspect, the acquisition unit may further acquire quantity relating to performance of the facility, and the index value specification unit may specify the index value, based on the quantity relating to the performance.

According to a third aspect of the present invention, in the plant evaluation device according to the first or second aspect, the acquisition unit may further acquire a quantity relating to quality of the facility, and the index value specification unit may specify the index value, based on the quantity relating to the quality.

According to a fourth aspect of the present invention, in the plant evaluation device according to any one of the first to third aspects, the index value output unit may output an alarm, based on a comparison between the index value and a predetermined threshold value.

According to a fifth aspect of the present invention, the plant evaluation device according to any one of the first to fourth aspects may further include a prediction unit that is configured to predict a future quantity of the plant, based on a past quantity of the plant and the quantity acquired by the acquisition unit. The index value specification unit may specify the index value for each of the acquired quantity and the predicted future quantity.

According to a sixth aspect of the present invention, in the plant evaluation device according to any one of the first to fifth aspects, the acquisition unit may acquire the quantity at one timing, and the index value specification unit may specify the index value, based on the quantity acquired by the acquisition unit at the timing.

According to a seventh aspect of the present invention, in the plant evaluation device according to any one of the first to sixth aspects, the index value output unit may output a time series of the index value.

According to an eighth aspect of the present invention, a plant evaluation method includes the steps of acquiring a quantity relating to an operating rate of a facility of a plant and a quantity relating to energy consumption of the facility; specifying an index value that is higher as the energy consumption is lower and that is higher as the operating rate is higher, or an index value that is lower as the energy consumption is lower and that is lower as the operating rate is higher based on the acquired quantity; and outputting information relating to the index value.

According to a ninth aspect of the present invention, a program is provided that causes a computer to execute a process including the steps of: acquiring a quantity relating to an operating rate of a facility of a plant and a quantity relating to energy consumption of the facility; specifying an index value that is higher as the energy consumption is lower and that is higher as the operating rate is higher, or an index value that is lower as the energy consumption is lower and an index value that is lower as the operating rate is higher, based on the acquired quantity; and outputting information relating to the index value.

Advantageous Effects of Invention

According to at least one of the above-described aspects, a user of the plant evaluation device can easily evaluate the plant in view of production effectiveness and energy efficiency by recognizing the index value output by the plant evaluation device.

DESCRIPTION OF EMBODIMENTS

First Embodiment

<<Plant Evaluation System>>

Hereinafter, embodiments will be described in detail with reference to the drawings.

Figure 1:
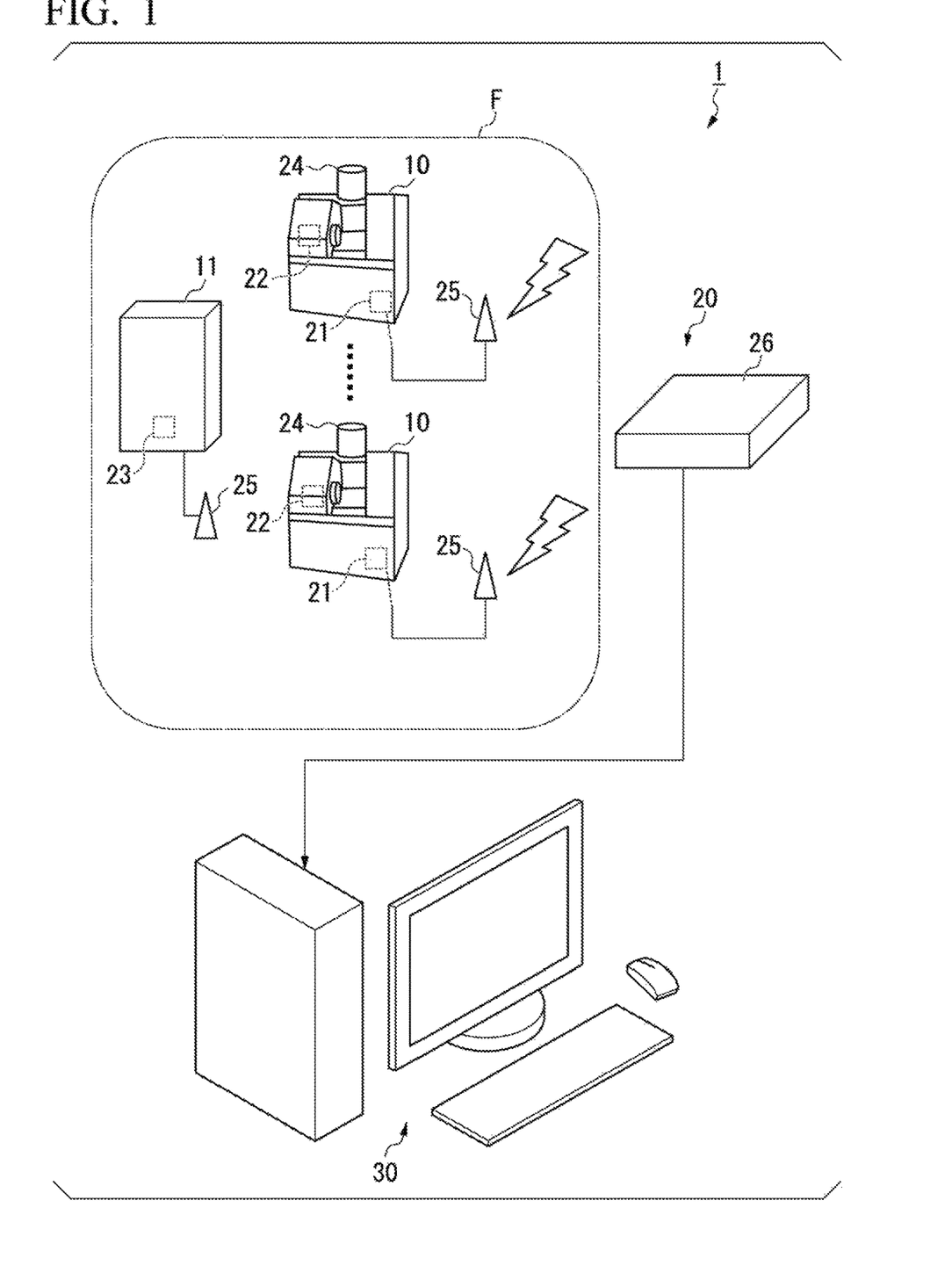
FIG. 1 is a schematic diagram representing a configuration of a plant evaluation system according to a first embodiment.

FIG. 1 is a schematic diagram representing a configuration of a plant evaluation system according to a first embodiment.

A plant evaluation system 1 includes a plurality of production facilities 10, a measurement system 20, and a plant evaluation device 30.

The production facility 10 is installed in a plant F, is driven by electric power, and executes various processes in accordance with an operator's operation. The production facility 10 can manufacture various products (manufacturing target).

The measurement system 20 measures information relating to the production facility 10 (for example, current value, voltage, electric energy, or vibration). A configuration example of the measurement system 20 is as follows. The measurement system 20 includes a first sensor 21, a second sensor 22, a third sensor 23, a defective product inspection device 24, a transmitter 25, and a receiver 26. The first sensor 21 measures whether or not the production facility 10 is in a state corresponding to a load time. For example, the first sensor 21 measures electric power supplied to the production facility 10, and specifies a time during which a power source is turned on in the production facility 10, as the load time. The second sensor 22 measures whether or not the production facility 10 is in a state corresponding to an operating time, and whether or not the production facility 10 is in a state corresponding to a net operating time. For example, the second sensor 22 measures vibration of a manufacturing unit of the production facility 10, specifies a time during which the manufacturing unit is operated, as the operating time, and specifies a time during which the manufacturing unit manufactures a workpiece, as the net operating time. The third sensor 23 measures a current of a non-production facility 11 (for example, air conditioning facility) of the plant F.

The defective product inspection device 24 is a device which determines whether or not a product produced by the production facility 10 is a defective product. For example, the defective product inspection device 24 includes an imaging device and a computer, the imaging device images the product produced by the production facility 10, and the computer performs pattern matching processing on a captured image. In this manner, the defective product inspection device 24 detects the product, and determines quality of the product. The defective product inspection device 24 outputs the number of non-defective products and the number of defective products per unit time.

The transmitter 25 and the receiver 26 are connected to each other by wireless communication. The wireless communication is independent of wireless communication used in the plant F. Therefore, the wireless communication used by the measurement system 20 does not interfere with a wireless communication environment of the plant F. The transmitter 25 is installed in the vicinity of the first sensor 21, and is connected to the first sensor 21, the second sensor 22, the third sensor 23, and the defective product inspection device 24 by wired communication. The transmitter 25 transmits information relating to the production facility 10 which is measured by the first sensor 21 and the second sensor 22, a current value of the non-production facility 11 which is measured by the third sensor 23, and the number of non-defective products and the number of defective products which are detected by the defective product inspection device 24, to the receiver 26 by the wireless communication. The receiver 26 records the information relating to the production facility 10 which is received from the transmitter 25, the current value of the non-production facility 11, and the number of non-defective products and the number of defective products, as a time series. The plant evaluation device 30 can acquire the time series recorded in the receiver 26. A configuration of the measurement system 20 is not limited thereto.

The plant evaluation device 30 outputs an overall evaluation value which is an index value obtained in view of the production effectiveness and energy efficiency of the production facility 10, based on the time series of information relating to a plurality of the production facilities 10 which is input from the measurement system 20. In the first embodiment, a transition of a past overall evaluation value of the plant F and a transition of a past overall evaluation value of each production facility 10 are displayed as a graph in accordance with an instruction of a user.

<<Configuration of Plant Evaluation Device>>

Figure 2:
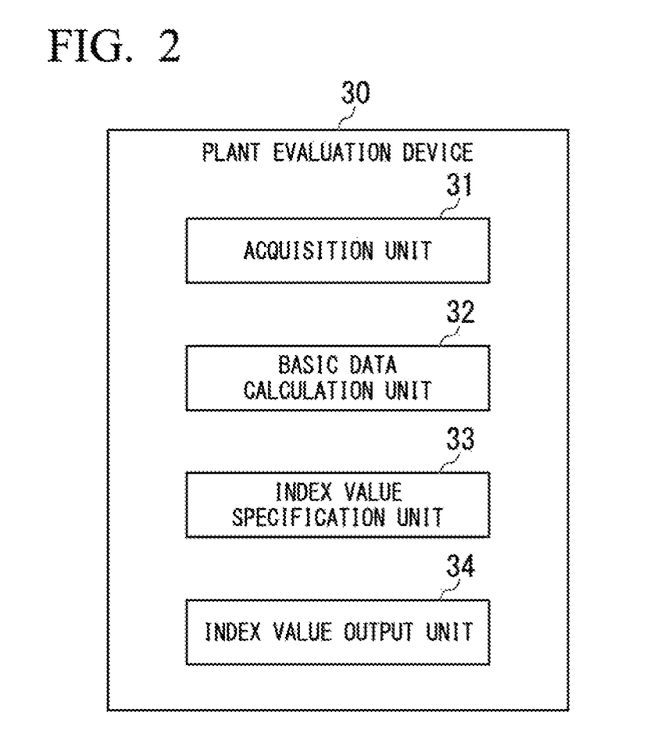
FIG. 2 is a schematic block diagram representing a configuration of a plant evaluation device according to the first embodiment.

FIG. 2 is a schematic block diagram representing a configuration of the plant evaluation device according to the first embodiment.

The plant evaluation device 30 includes an acquisition unit 31, a basic data calculation unit 32, an index value specification unit 33, and an index value output unit 34.

The acquisition unit 31 acquires the time series of the information relating to the production facility 10, the current value of the non-production facility 11, and the number of non-defective products and the number of defective products, from the measurement system 20.

The basic data calculation unit 32 calculates a load time, an operating time, a net operating time, and power consumption quantity of the production facility 10, based on the time series of the information acquired by the acquisition unit 31, in addition, the basic data calculation unit 32 calculates a production quantity and the number of non-defective products of the production facility 10 during the load time, based on the time series of the number of non-defective products and the number of defective products. For example, the basic data calculation unit 32 calculates a power consumption quantity of each production facility 10 from the current value of each production facility 10 in a calculation target time zone. For example, the basic data calculation unit 32 calculates the power consumption quantity of each non-production facility 11 from the current value of the non-production facility 11 in a calculation target time zone.

An operating rate of the production facility 10 is a value obtained by dividing the operating time by the load time. Accordingly, the operating time of the production facility 10 is an example of a quantity relating to the operating rate of the production facility 10.

Effectiveness of the production facility 10 is a value obtained by dividing the net operating time by the operating time. Accordingly, the net operating time of the production facility 10 is an example of a quantity relating to the effectiveness of the production facility 10.

The index value specification unit 33 calculates the overall evaluation value, based on the load time, the operating time, the net operating time, the production quantity, the number of non-defective products, and the power consumption which are calculated by the basic data calculation unit 32. Specifically, the index value specification unit 33 calculates the overall evaluation value by the following procedure. The index value specification unit 33 calculates the operating rate of each production facility 10 by dividing the operating time by the load time. The index value specification unit 33 calculates the effectiveness of each production facility 10 by dividing the net operating time by the operating time. The index value specification unit 33 calculates quality of each production facility 10 by dividing the number of non-defective products by the production quantity. The index value specification unit 33 calculates the overall facility effectiveness of each production facility 10 by multiplying the operating rate, the effectiveness, and the quality. The index value specification unit 33 calculates the energy consumption rate of each production facility 10 by dividing the power consumption quantity by the production quantity. The index value specification unit 33 calculates the overall evaluation value of each production facility 10 by dividing the overall facility effectiveness of each production facility 10 by the energy consumption rate, that is, by multiplying the overall facility effectiveness and a reciprocal of the energy consumption rate.

In addition, the index value specification unit 33 calculates the energy consumption rate of the whole plant F by dividing a sum of the power consumption quantities of all production facilities 10 and the power consumption quantities of all non-production facilities 11 by a sum of the production quantities of all production facilities 10. That is, the index value specification unit 33 calculates the energy consumption rate of the whole plant F by dividing the current value consumed in the plant F by the production quantity of the plant F. Then, the index value specification unit 33 calculates the overall evaluation value of the whole plant by dividing an average value of the overall facility effectiveness of each production facility 10 by the energy consumption rate of the whole plant F.

The index value specification unit 33 may calculate the overall facility effectiveness of the whole plant F by multiplying the operating rate, the effectiveness, and the quality of the whole plant F, and then calculate the overall evaluation value of the whole plant F by dividing the overall facility effectiveness by the energy consumption rate of the whole plant F.

The overall facility effectiveness has a higher value as the operating rate is higher, and the reciprocal of the energy consumption rate has a higher value as the energy consumption is lower. That is, the overall evaluation value is a higher index value as the energy consumption is lower, and is a higher index value as the operating rate is higher.

The index value output unit 34 outputs the overall evaluation value of the whole plant F which is specified by the index value specification unit 33, and the overall evaluation value of each production facility 10.

<<Operation of Plant Evaluation Device>>

Figure 3:
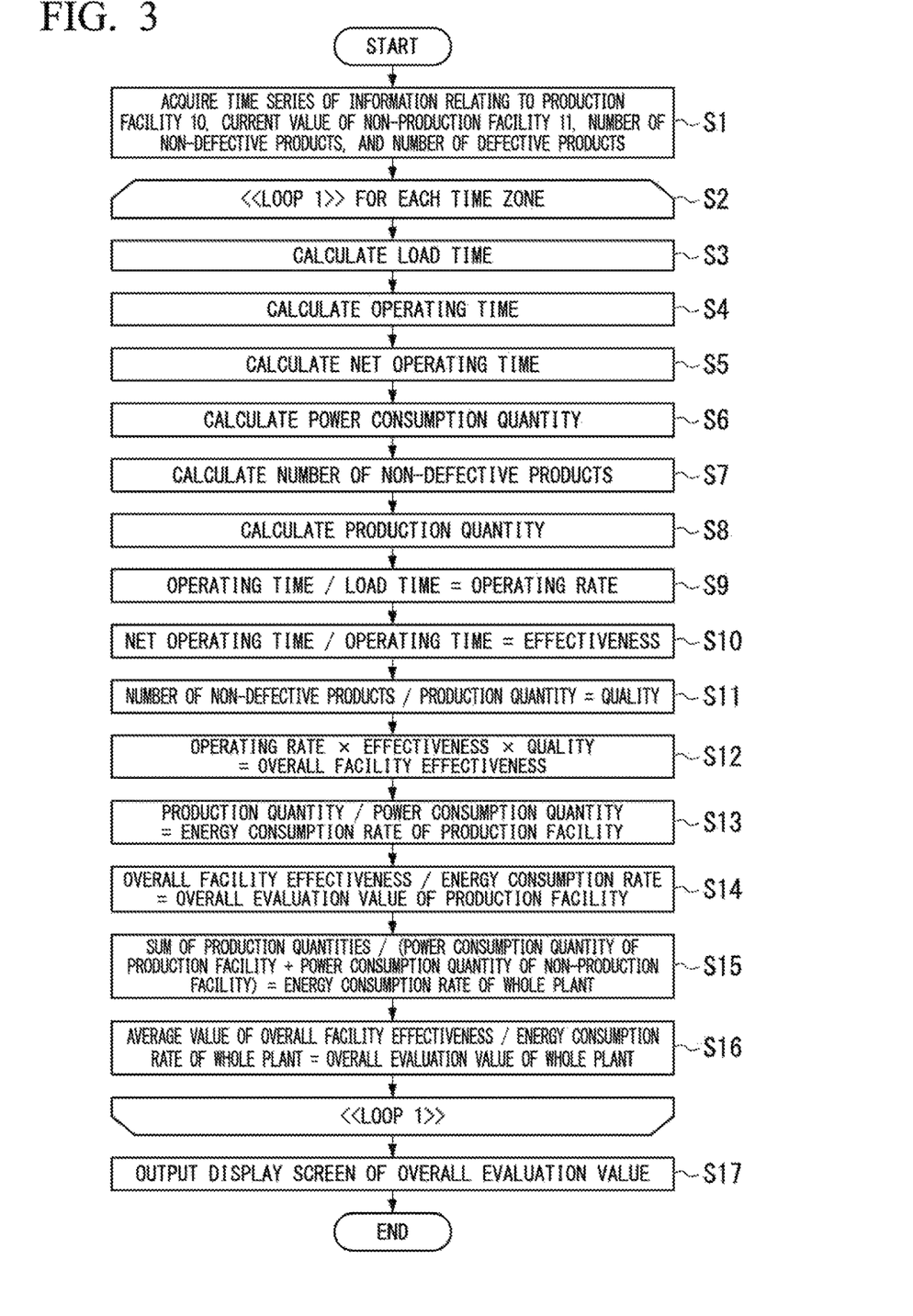
FIG. 3 is a flowchart representing an operation of the plant evaluation device according to the first embodiment.

FIG. 3 is a flowchart representing an operation of the plant evaluation device according to the first embodiment.

When the user inputs an output instruction of the overall evaluation value to the plant evaluation device 30, the acquisition unit 31 acquires the time series of the information relating to the production facility 10, the current value of the non-production facility 11, and the number of non-defective products and the number of defective products, from the measurement system 20 (Step S1).

The plant evaluation device 30 selects a time zone one by one for each calculation target unit time (for example, one hour) of the overall evaluation value, and performs Steps S3 to S15 below for the selected time zone (Step S2).

First, the basic data calculation unit 32 obtains the load time in the selected time zone, based on the information acquired by the acquisition unit 31 (Step S3). The basic data calculation unit 32 obtains the operating time in the selected time zone, based on the information acquired by the acquisition unit 31 (Step S4). The basic data calculation unit 32 can obtain the net operating time in the selected time zone, based on the information acquired by the acquisition unit 31 (Step S5). The basic data calculation unit 32 calculates the power consumption quantity in the time zone from the time series of the current value in the selected time zone (Step S6). The basic data calculation unit 32 calculates the number of non-defective products in the time zone by integrating the number of non-defective products in the selected time zone (Step S7). The basic data calculation unit 32 calculates the production quantity in the time zone by calculating a total sum of the number of non-defective products and the number of defective products in the selected time zone (Step S8).

The index value specification unit 33 calculates the operating rate of each production facility 10 in the selected time zone by dividing the operating time by the load time (Step S9). The index value specification unit 33 calculates the effectiveness of each production facility 10 in the selected time zone by dividing the net operating time by the operating time (Step S10). The index value specification unit 33 calculates the quality of each production facility 10 in the selected time zone by dividing the number of non-defective products by the production quantity (Step S11). The index value specification unit 33 calculates the overall facility effectiveness of each production facility 10 in the selected time zone by multiplying the operating rate, the effectiveness, and the quality (Step S12).

The index value specification unit 33 calculates the energy consumption rate of each production facility 10 in the selected time zone by dividing the power consumption quantity by the production quantity (Step S13). The index value specification unit 33 calculates the overall evaluation value of each production facility 10 in the selected time zone by dividing the overall facility effectiveness of each production facility 10 by the energy consumption rate (Step S14).

In addition, the index value specification unit 33 calculates the energy consumption rate of the whole plant F by dividing the sum of the power consumption quantities of all production facilities 10 and the power consumption quantities of all non-production facilities 11 by the sum of the production quantities of all production facilities 10 (Step S15). The index value specification unit 33 calculates the overall evaluation value of the whole plant by dividing the average value of the overall facility effectiveness of each production facility 10 by the energy consumption rate of the whole plant F (Step S16). The index value specification unit 33 may calculate the overall facility effectiveness of the whole plant F by multiplying the operating rate, the effectiveness, and the quality of the whole plant F, and then calculate the overall evaluation value of the whole plant F by dividing the overall facility effectiveness by the energy consumption rate of the whole plant F.

That is, the index value specification unit 33 specifies the overall evaluation value, based on the information relating to the production facility 10, the current value of the non-production facility 11, and the number of non-defective products and the number of defective products which are acquired for one time zone. Actually, there is a possibility that the time zone required for manufacturing one product may be different from the time zone where the quality of the product is detected. On the other hand, the index value specification unit 33 according to the first embodiment can quickly specify the overall evaluation value with a small calculation quantity by specifying the overall evaluation value for the time zone, based on the information relating to the production facility 10, the current value of the non-production facility 11, and the number of non-defective products and the number of defective products which are acquired in the same time zone.

When the plant evaluation device 30 calculates the overall evaluation value for each time zone, the index value output unit 34 generates and outputs a display screen of the overall evaluation value (Step S17). In accordance with a user's instruction, the index value output unit 34 generates the display screen of the overall evaluation value of the whole plant F or the display screen of the overall evaluation value for each production facility 10.

Figure 4:
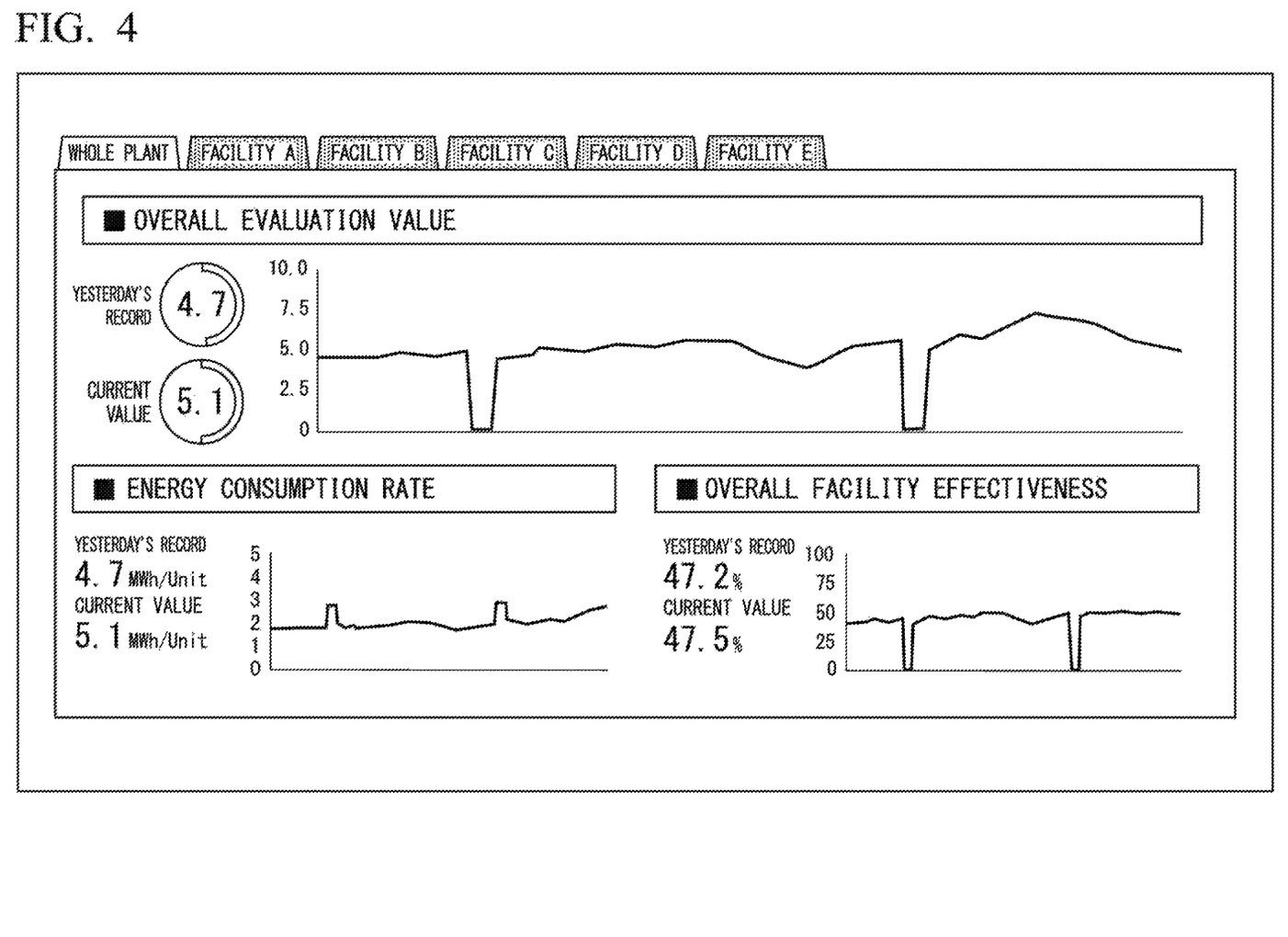
FIG. 4 is a diagram representing an example of a display screen of an overall evaluation value of a whole plant according to the first embodiment.

FIG. 4 is a diagram representing an example of the display screen of the overall evaluation value of the whole plant according to the first embodiment.

Figure 5:
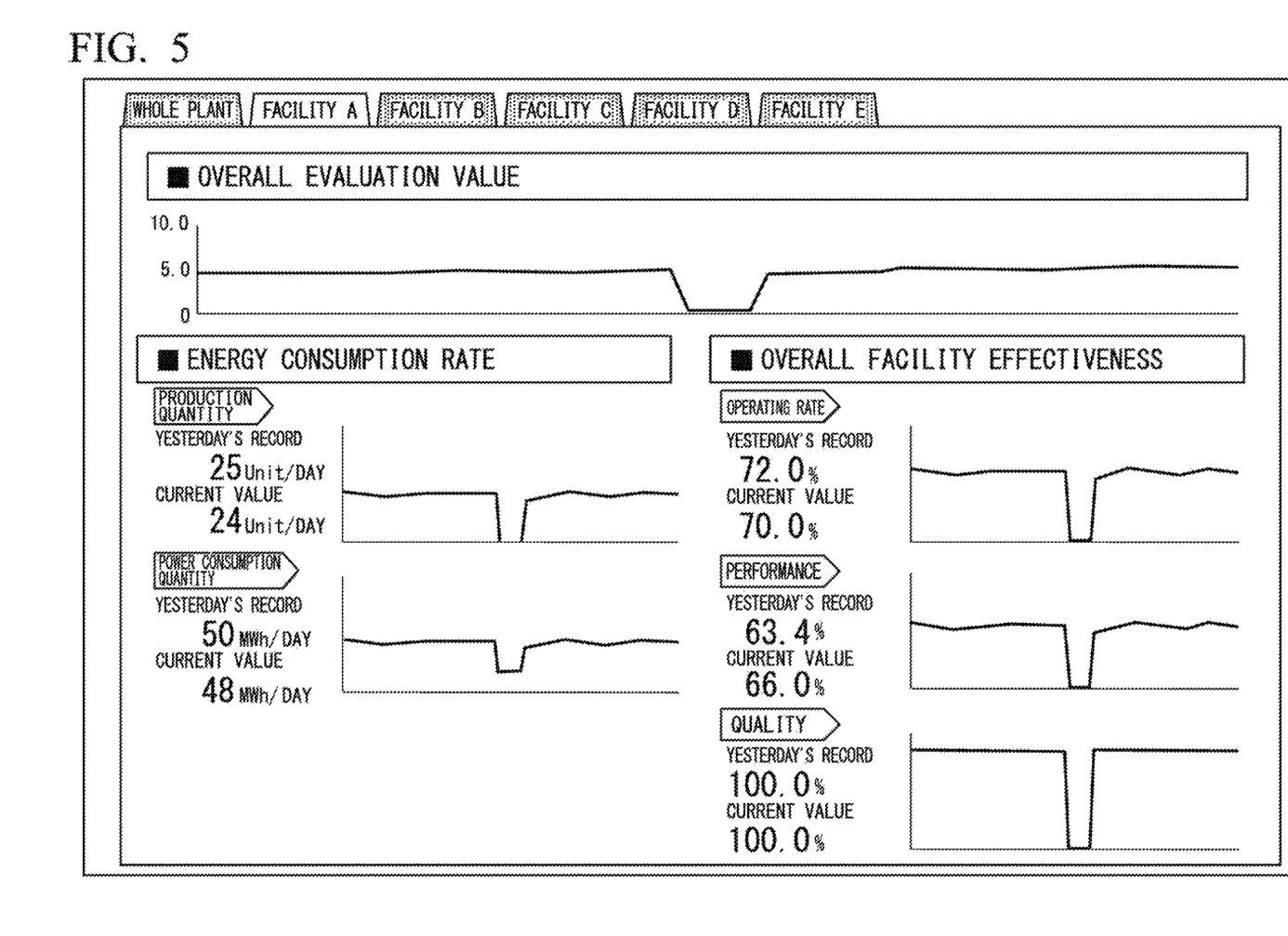
FIG. 5 is a diagram representing an example of a display screen of an overall evaluation value for each production facility according to the first embodiment.

When the user inputs an instruction to generate the display screen of the overall evaluation value of the whole plant F to the plant evaluation device 30, the index value output unit 34 generates the display screen of the overall evaluation value of the whole plant F which is illustrated in FIG. 5. The display screen of the overall evaluation value of the whole plant F includes a graph representing the time series of the overall evaluation value of the whole plant F, a graph representing the time series of the energy consumption rate of the whole plant F, and a graph representing the time series of the overall facility effectiveness of the whole plant F. In the graph representing the time series of the overall evaluation value, a vertical axis indicates the overall evaluation value, and a horizontal axis indicates a time. In the graph representing the time series of the energy consumption rate, the vertical axis indicates the energy consumption rate, and the horizontal axis indicates the time. In the graph representing the time series of the overall facility effectiveness, the vertical axis indicates the overall facility effectiveness, and the horizontal axis indicates the time.

In this manner, the user can visually check the transition of the overall evaluation value and can evaluate the plant in view of the production effectiveness and the energy efficiency. In addition, the user can easily recognize whether a cause thereof is the production effectiveness or the energy efficiency when the overall evaluation value is high or low by visually checking the graph representing the time series of energy consumption rate and the graph representing the time series of overall facility effectiveness.

The user can switch between the display screen of the overall evaluation value of the whole plant F and the display screen of the overall evaluation value for each production facility 10 by selecting an upper tab on the display screen of the overall evaluation value.

FIG. 5 is a diagram representing an example of the display screen of the overall evaluation value for each production facility according to the first embodiment. When the user inputs an instruction to generate the display screen of the overall evaluation value for each production facility 10 to the plant evaluation device 30, the index value output unit 34 generates the display screen of the overall evaluation value for each production facility 10 which is illustrated in FIG. 5. The display screen of the overall evaluation value for each production facility 10 includes a graph representing the time series of the overall evaluation value of the production facility 10, and a graph representing the time series of the production quantity of the production facility 10, the power consumption quantity, the operating rate, performance, and the quality.

In this manner, the user can visually check the transition of the overall evaluation value and can evaluate the production facility 10 in view of the production effectiveness and the energy efficiency. In addition, the user can easily recognize the detailed cause when the overall evaluation value is high or low by visually checking the graph representing the time series of the production quantity, the power consumption quantity, the operating rate, the performance, and the quality.

<<Operation/Effect>>

As described above, according to the first embodiment, the plant evaluation device 30 specifies the overall evaluation value by multiplying the overall facility effectiveness and the reciprocal of the energy consumption rate and outputs the overall evaluation value.

In this manner, the user can easily evaluate the plant in view of the production effectiveness and the energy efficiency.

Specifically, the higher overall facility effectiveness indicates that the evaluation of the plant is higher, and the lower energy consumption rate indicates that the evaluation of the plant is higher. Therefore, the overall evaluation value obtained by multiplying the overall facility effectiveness and the reciprocal of the energy consumption rate is an index value indicating that the evaluation of the plant is higher as the overall evaluation value is higher. The user can evaluate the plant in view of the production effectiveness and the energy efficiency by recognizing the index value.

Second Embodiment

The plant evaluation device 30 according to the first embodiment outputs the time series of the past overall evaluation value of the plant F, based on the quantity measured by the measurement system 20. In contrast, the plant evaluation device 30 according to a second embodiment outputs a predicted value of the future overall evaluation value of the plant F, based on a production plan.

Figure 6:
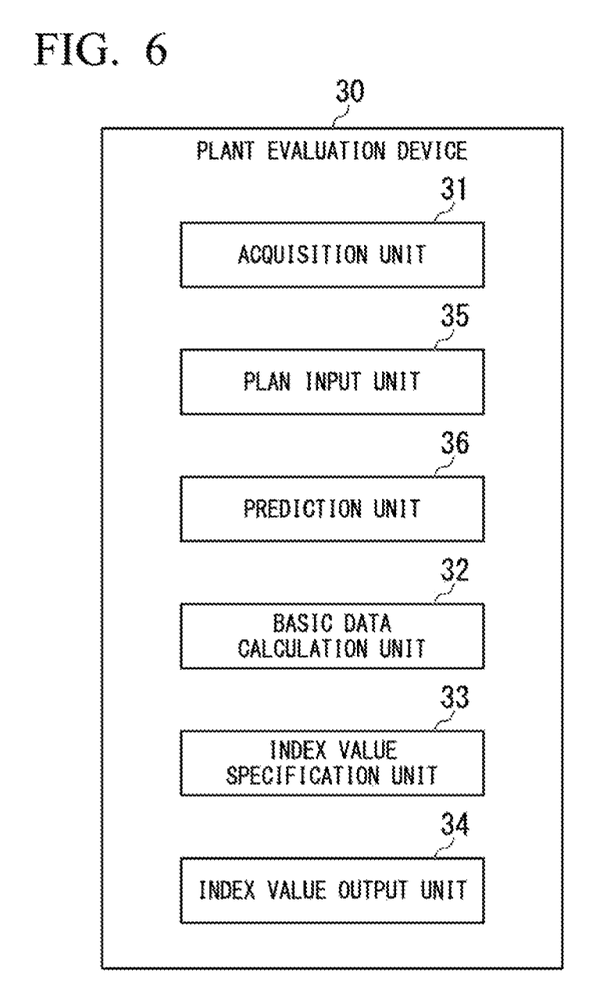
FIG. 6 is a schematic block diagram representing a configuration of a plant evaluation device according to a second embodiment.

FIG. 6 is a schematic block diagram representing a configuration of the plant evaluation device according to the second embodiment.

The plant evaluation device 30 according to the second embodiment further includes a plan input unit 35 and a prediction unit 36 in addition to the configuration of the first embodiment.

The plan input unit 35 receives an input of past and future production plans of the plant F from the user. The production plan includes the time series indicating whether or not to operate each production facility 10.

The prediction unit 36 predicts a future time series of information relating to the production facility 10, the current value of the non-production facility 11, and the number of non-defective products and the number of defective products, based on the time series of the production plan input to the plan input unit 35, the information relating to the production facility 10, the current value of the non-production facility 11, and the number of non-defective products and the number of defective products which are acquired by the acquisition unit 31. The prediction unit 36 predicts the future time series of the information relating to the production facility 10, the current value of the non-production facility 11, the number of non-defective products, and the number of defective products by machine learning using, as teacher data, for example, a combination of the production plan and the time series of the information relating to the production facility 10, the current value of the non-production facility 11, and the number of non-defective products and the number of defective products which are acquired by the acquisition unit 31. In addition, the prediction unit 36 may predict the future time series of the information relating to the production facility 10, the current value of the non-production facility 11, and the number of non-defective products and the number of defective products by using a simulator that simulates the plant F.

In addition to the time series of the information relating to the production facility 10, the current value of the non-production facility 11, and the number of non-defective products and the number of defective products which are acquired by the acquisition unit 31, the basic data calculation unit 32 calculates the operating time, the net operating time, the power consumption quantity, the production quantity, and the number of non-defective products in each time zone, from the future time series of the information relating to the production facility 10, the current value of the non-production facility 11, and the number of non-defective products and the number of defective products which are predicted by the prediction unit 36.

In this manner, the index value specification unit 33 can specify the past and future overall evaluation values.

Third Embodiment

The plant evaluation device 30 according to the first embodiment and the second embodiment outputs the display screen that displays the overall evaluation value. In contrast, the plant evaluation device 30 according to a third embodiment outputs an alarm in a case where the overall evaluation value is below a threshold value.

Figure 7:
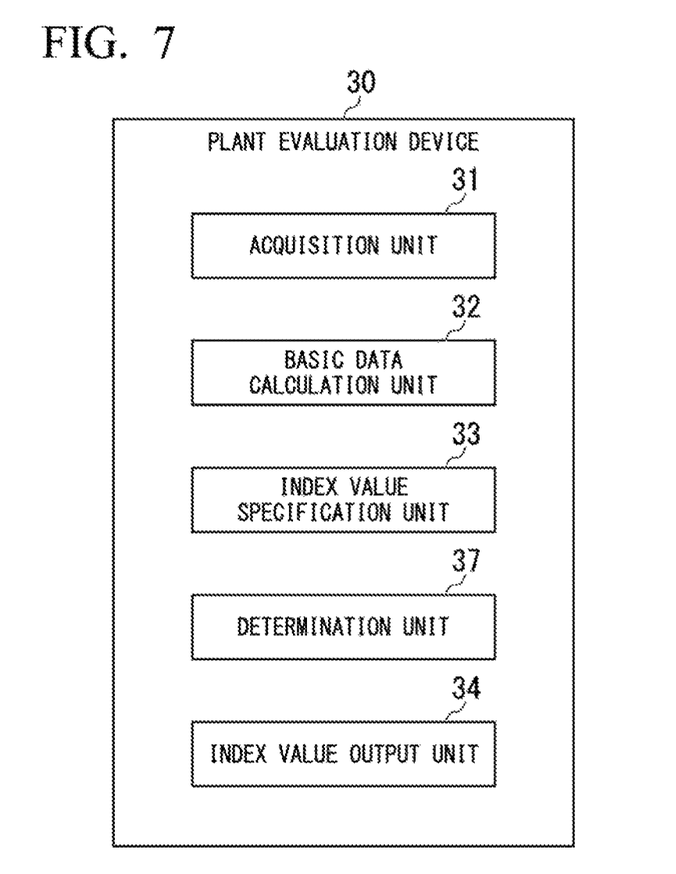
FIG. 7 is a schematic block diagram representing a configuration of a plant evaluation device according to a third embodiment.

FIG. 7 is a schematic block diagram representing a configuration of the plant evaluation device according to the third embodiment.

The plant evaluation device 30 according to the third embodiment further includes a determination unit 37 in addition to the configuration of the first embodiment.

The determination unit 37 determines whether or not the overall evaluation value specified by the index value specification unit 33 is smaller than the threshold value. The threshold value is a value set in advance by the user.

The index value output unit 34 outputs the alarm in a case where the overall evaluation value specified by the index value specification unit 33 is smaller than the threshold value. For example, the alarm is output by sending an email to a user's email address set in advance or displaying a message on a screen.

Figure 8:
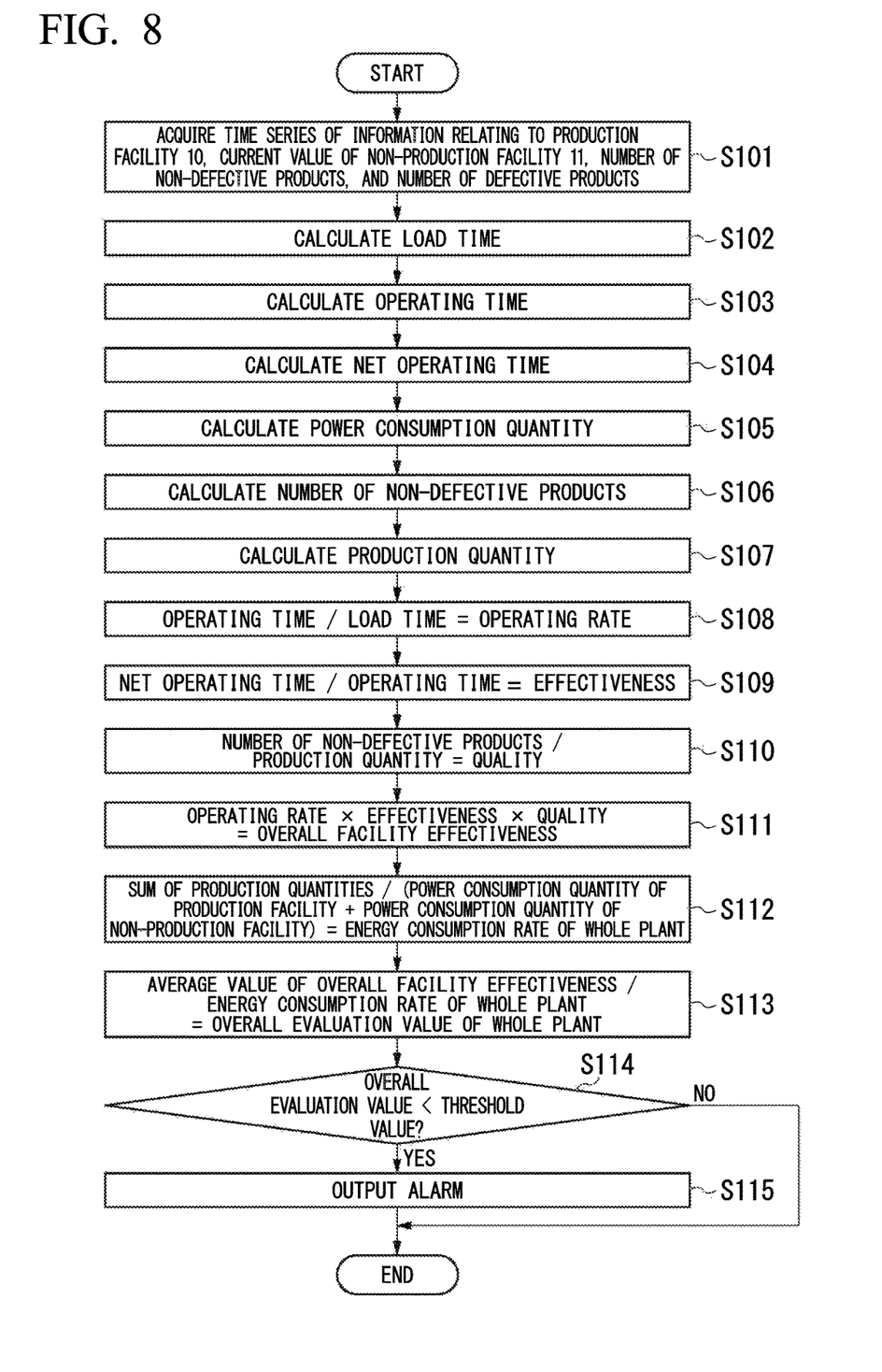
FIG. 8 is a flowchart representing an operation of the plant evaluation device according to the third embodiment.

FIG. 8 is a flowchart representing an operation of the plant evaluation device according to the third embodiment.

The plant evaluation device 30 executes processes illustrated in FIG. 8 for each time zone relating to a unit load time. The acquisition unit 31 of the plant evaluation device 30 acquires the time series of the information relating to the production facility 10, the current value of the non-production facility 11, and the number of non-defective products and the number of defective products, from the measurement system 20 (Step S101).

First, the basic data calculation unit 32 obtains the load time (Step S102). The basic data calculation unit 32 obtains the operating time (Step S103). The basic data calculation unit 32 can obtain the net operating time (Step S104). The basic data calculation unit 32 calculates the power consumption quantity in the time zone from a value relating to the current time zone in the time series of the current value of a main power supply (Step S105). The basic data calculation unit 32 calculates the number of non-defective products in the time zone by integrating the number of non-defective products in the current time zone (Step S106). The basic data calculation unit 32 calculates the production quantity in the time zone by calculating the total sum of the number of non-defective products and the number of defective products in the current time zone (Step S107).

The index value specification unit 33 calculates the operating rate of each production facility 10 by dividing the operating time by the load time (Step S108). The index value specification unit 33 calculates the effectiveness of each production facility 10 by dividing the net operating time by the operating time (Step S109). The index value specification unit 33 calculates the quality of each production facility 10 by dividing the number of non-defective products by the production quantity (Step S110). The index value specification unit 33 calculates the overall facility effectiveness of each production facility 10 by multiplying the operating rate, the effectiveness, and the quality (Step S111).

The index value specification unit 33 calculates the energy consumption rate of the whole plant F by dividing the sum of the power consumption quantity of all production facilities 10 and the power consumption quantity of all non-production facilities 11 by the sum of the production quantities of all production facilities 10 (Step S112). The index value specification unit 33 calculates the overall evaluation value of the whole plant F by dividing the average value of the overall facility effectiveness of each production facility 10 by the energy consumption rate of the whole plant F (Step S113).

The index value specification unit 33 may calculate the overall facility effectiveness of the whole plant F by multiplying the operating rate, the effectiveness, and quality of the whole plant F and then calculate the overall evaluation value of the whole plant F by dividing the overall facility effectiveness by the energy consumption rate of the whole plant F.

The determination unit 37 determines whether or not the overall evaluation value specified by the index value specification unit 33 is smaller than the threshold value (Step S114). In a case where the overall evaluation value is smaller than the threshold value (Step S114: YES), the index value output unit 34 outputs an alarm indicating that the overall evaluation value is smaller than the threshold value (Step S115). On the other hand, in a case where the overall evaluation value is equal to or greater than the threshold value (Step S114: NO), the index value output unit 34 does not output the alarm.

Hitherto, one embodiment has been described in detail with reference to the drawings. However, the specific configuration is not limited to the above-described embodiment, and various design changes can be made.

The plant evaluation device 30 according to the above-described embodiment calculates the overall evaluation value by multiplying the overall facility effectiveness and the reciprocal of the energy consumption rate. However, the invention is not limited thereto. For example, the plant evaluation device 30 according to another embodiment may calculate the overall evaluation value by multiplying the operating rate of the production facility 10 and the reciprocal of the energy consumption rate. That is, in a case where the performance and quality of the plant are substantially constant, the overall evaluation value may be calculated using the operating rate instead of the overall facility effectiveness. In addition, the plant evaluation device 30 according to another embodiment may calculate the overall evaluation value by multiplying the operating rate of the production facility 10, the effectiveness, and the reciprocal of the energy consumption rate. That is, in a case where the quality is substantially constant, the overall evaluation value may be calculated using a value obtained by multiplying the operating rate and the performance, instead of the overall facility effectiveness.

In addition, in another embodiment, the overall evaluation value may be calculated by multiplying the reciprocal of the overall facility effectiveness and the energy consumption rate. That is, the overall evaluation value according to another embodiment may be a lower index value as the energy consumption is lower and may be a lower index value as the operating rate is higher.

In addition, the plant evaluation device 30 according to the above-described embodiment calculates the overall evaluation value, based on the time series of the information relating to the production facility 10, the current value of the non-production facility 11, and the number of non-defective products and the number of defective products which are acquired from the measurement system 20. However, the invention is not limited thereto. For example, in a case where the plant evaluation system 1 according to another embodiment includes a management device that stores the time series of the information relating to the production facility 10, the current value of the non-production facility 11, and the number of non-defective products and the number of defective products, separately from the measurement system 20, the acquisition unit 31 of the plant evaluation device 30 may acquire at least one of the information relating to the production facility 10, the current value of the non-production facility 11, and the number of non-defective products and the number of defective products, from the management device. For example, in a case where the management device of the plant evaluation system 1 according to another embodiment stores the number of non-defective products and the number of defective products, the measurement system 20 may not include the defective product inspection device 24.

In addition, the plant evaluation device 30 according to the above-described embodiment calculates the quality by dividing the number of non-defective products by the production quantity. However, the invention is not limited thereto. For example, the plant evaluation device 30 according to another embodiment may calculate the quality by dividing a value operating time by the net operating time.

Figure 9:
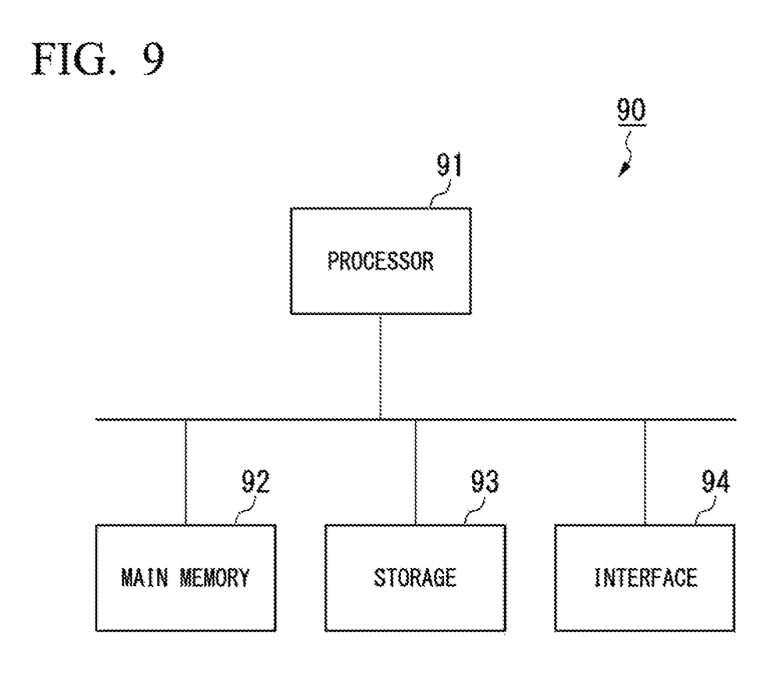
FIG. 9 is a schematic block diagram representing a configuration of a computer according to at least one of the embodiments.

FIG. 9 is a schematic block diagram representing a configuration of a computer according to at least one of the embodiments.

A computer 90 includes a processor 91, a main memory 92, a storage 93, and an interface 94.

The above-described plant evaluation device 30 is installed in the computer 90. Then, an operation of each of the above-described processing units is stored in the storage 93 in a form of a program. The processor 91 reads the program from the storage 93, loads the program in the main memory 92 and executes the above-described processing in accordance with the program.

Examples of the storage 93 include a hard disk drive (HDD), a solid state drive (SSD), a magnetic disk, a magneto-optical disk, a compact disc read only memory (CD-ROM), and a digital versatile disc read only memory (DVD-ROM), and a semiconductor memory. The storage 93 may be an internal medium directly connected to a bus of the computer 90, or may be an external medium connected to the computer 90 via the interface 94 or a communication line. In addition, in a case where the program is distributed to the computer 90 via the communication line, the computer 90 receiving the distribution may deploy the program in the main memory 92, and may execute the above-described processing. In at least one of the embodiments, the storage 93 is a non-transitory and tangible storage medium.

In addition, the program may partially realize the above-described function. Furthermore, the program may be a so-called difference file (difference program) that realizes the above-described function in combination with another program stored in advance in the storage 93.

INDUSTRIAL APPLICABILITY

A user of the plant evaluation device can easily evaluate the plant in view of the production effectiveness and the energy efficiency by recognizing the index value output by the plant evaluation device.

REFERENCE SIGNS LIST

1 Plant evaluation system
10 Production facility
20 Measurement system
30 Plant evaluation device
31 Acquisition unit
32 Basic data calculation unit
33 Index value specification unit
34 Index value output unit
35 Plan input unit
36 Prediction unit
37 Determination unit

The invention claimed is:
1. A plant evaluation device comprising:
a processor; and a non-transitory memory having stored thereon executable instructions, which when executed, cause the processor to perform:

acquiring a time series of information from a measurement system, wherein the time series relates to production facilities and non-production facilities of a plant, and includes
- one or more of a current value, a voltage, electric energy, and vibrations measured with respect to the production facilities,
- a current value of the non-production facilities,
- a number of non-defective products produced by each production facility, and
- a number of defective products produced by each production facility;

calculating a respective load time, operating time, net operating time, production quantity, and energy consumption of each of the production facilities, and calculating a respective energy consumption of each of the non-production facilities, based on the time series acquired from the measurement system;

specifying an index value for evaluating the plant, wherein the index value is higher as the energy consumption is lower and is higher as an operating rate is higher, or is lower as the energy consumption is lower and is lower as the operating rate is higher, wherein the index value is determined by
- calculating an operating rate of each production facility based on its operating time and load time,
- calculating an effectiveness of each production facility based on its net operating time and operating time,
- calculating a quality of each production facility based on its production quantity and number of non-defective products,
- calculating an overall facility effectiveness of each production facility based on its operating rate, effectiveness and quality,
- calculating an energy consumption rate of each production facility based on its energy consumption and production quantity,
- calculating an overall evaluation value for each production facility based on its overall facility effectiveness and energy consumption rate,
- calculating an energy consumption rate of the plant based on the energy consumption of all production facilities, the energy consumption of all non-production facilities, and the production quantities of all production facilities, and
- calculating the index value based on an average value of the overall facility effectiveness of each production facility and the energy consumption rate of the plant; and outputting an alarm, based on a comparison between the index value and a predetermined threshold.

2. The plant evaluation device according to claim 1, wherein the outputting of the information includes outputting the index value, the overall facility effectiveness, and the energy consumption rate, as information relating to the index value.

3. The plant evaluation device according to claim 1, wherein the outputting of the information includes outputting the production quantity of each production facility of the plant, the energy consumption, the operating rate of each production facility, the effectiveness of each production facility, and the quality of each production facility, as information relating to the index value.

4. The plant evaluation device according to claim 1, wherein the executable instructions, when executed, further cause the processor to perform:
predicting a future time series of the plant, based on a past quantity of the plant and the time series acquired from the measurement system,
wherein the specifying of the index value includes calculating the index value for the predicted future time series.

5. The plant evaluation device according to claim 1, wherein the outputting of the information includes outputting a time series of the index value.

6. A plant evaluation method comprising:

acquiring a time series of information from a measurement system, wherein the time series relates to production facilities and non-production facilities of a plant, and includes
- one or more of a current value, a voltage, electric energy, and vibrations measured with respect to the production facilities,
- a current value of the non-production facilities,
- a number of non-defective products produced by each production facility, and
- a number of defective products produced by each production facility;

calculating a respective load time, operating time, net operating time, production quantity, and energy consumption of each of the production facilities, and calculating a respective energy consumption of each of the non-production facilities, based on the time series acquired from the measurement system;

specifying an index value for evaluating the plant, wherein the index value is higher as the energy consumption is lower and is higher as an operating rate is higher, or is lower as the energy consumption is lower and is lower as the operating rate is higher, wherein the index value is determined by
- calculating an operating rate of each production facility based on its operating time and load time,
- calculating an effectiveness of each production facility based on its net operating time and operating time,
- calculating a quality of each production facility based on its production quantity and number of non-defective products,
- calculating an overall facility effectiveness of each production facility based on its operating rate, effectiveness and quality,
- calculating an energy consumption rate of each production facility based on its energy consumption and production quantity,
- calculating an overall evaluation value for each production facility based on its overall facility effectiveness and energy consumption rate,
- calculating an energy consumption rate of the plant based on the energy consumption of all production facilities, the energy consumption of all non-production facilities, and the production quantities of all production facilities, and
- calculating the index value based on an average value of the overall facility effectiveness of each production facility and the energy consumption rate of the plant; and outputting an alarm, based on a comparison between the index value and a predetermined threshold.

7. A program that causes a computer to execute a process, the process comprising:

acquiring a time series of information from a measurement system, wherein the time series relates to production facilities and non-production facilities of a plant, and includes
- one or more of a current value, a voltage, electric energy, and vibrations measured with respect to the production facilities,
- a current value of the non-production facilities,
- a number of non-defective products produced by each production facility, and
- a number of defective products produced by each production facility;

calculating a respective load time, operating time, net operating time, production quantity, and energy consumption of each of the production facilities, and calculating a respective energy consumption of each of the non-production facilities, based on the time series acquired from the measurement system;

specifying an index value for evaluating the plant, wherein the index value is higher as the energy consumption is lower and is higher as an operating rate is higher, or is lower as the energy consumption is lower and is lower as the operating rate is higher, wherein the index value is determined by
- calculating an operating rate of each production facility based on its operating time and load time,
- calculating an effectiveness of each production facility based on its net operating time and operating time,
- calculating a quality of each production facility based on its production quantity and number of non-defective products,
- calculating an overall facility effectiveness of each production facility based on its operating rate, effectiveness and quality,
- calculating an energy consumption rate of each production facility based on its energy consumption and production quantity,
- calculating an overall evaluation value for each production facility based on its overall facility effectiveness and energy consumption rate,
- calculating an energy consumption rate of the plant based on the energy consumption of all production facilities, the energy consumption of all non-production facilities, and the production quantities of all production facilities, and
- calculating the index value based on an average value of the overall facility effectiveness of each production facility and the energy consumption rate of the plant and outputting an alarm, based on a comparison between the index value and a predetermined threshold.

* * * * *